(12) United States Patent
Zhou et al.

(10) Patent No.: US 12,418,926 B2
(45) Date of Patent: *Sep. 16, 2025

(54) CONSOLIDATED FEEDBACK INDICATION AND FEEDBACK TRANSMISSION

(71) Applicant: QUALCOMM Incorporated, San Diego, CA (US)

(72) Inventors: Yan Zhou, San Diego, CA (US); Tao Luo, San Diego, CA (US); Jelena Damnjanovic, Del Mar, CA (US); Iyab Issam Sakhnini, San Diego, CA (US); Mahmoud Taherzadeh Boroujeni, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/745,493

(22) Filed: Jun. 17, 2024

(65) Prior Publication Data

US 2024/0414723 A1 Dec. 12, 2024

Related U.S. Application Data

(63) Continuation of application No. 17/182,969, filed on Feb. 23, 2021, now Pat. No. 12,016,027.

(Continued)

(51) Int. Cl.
*H04W 72/23* (2023.01)
*H04L 1/1812* (2023.01)
*H04L 1/1829* (2023.01)

(52) U.S. Cl.
CPC .......... *H04W 72/23* (2023.01); *H04L 1/1812* (2013.01); *H04L 1/1864* (2013.01)

(58) Field of Classification Search
CPC ... H04L 1/1614; H04L 1/1812; H04L 1/1864; H04L 1/1887; H04W 72/042;
(Continued)

(56) References Cited

U.S. PATENT DOCUMENTS 8,477,682 B2   7/2013   Takeuchi et al.
8,819,501 B2   8/2014   Ko et al.
(Continued)

FOREIGN PATENT DOCUMENTS

CN   103391159 A   11/2013
CN   103391159 B   6/2016
(Continued)

OTHER PUBLICATIONS

Ericsson: "HARQ and Scheduling Enhancements for NR-U", 3GPP TSG-RAN WG1 Meeting #99, R1-1912711, Reno, USA, Nov. 18-22, 2019, Nov. 22, 2019 (Nov. 22, 2019) the Whole Document, 13 Pages.
(Continued)

*Primary Examiner* — Eric Nowlin
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, in a downlink control information, a bit map identifying a plurality of feedback indicators for a plurality of uplink transmissions, wherein the plurality of feedback indicators includes more than one acknowledgment and/or negative acknowledgment; and retransmit one or more of the plurality of uplink transmissions based at least in part on receiving the bit map identifying the plurality of feedback indicators. Numerous other aspects are provided.

20 Claims, 7 Drawing Sheets

Related U.S. Application Data

(60) Provisional application No. 62/981,492, filed on Feb. 25, 2020.

(58) Field of Classification Search
CPC .............. H04W 72/1289; H04W 72/14; H04W 72/1854; H04W 72/1861
See application file for complete search history.

(56) References Cited

U.S. PATENT DOCUMENTS

| | | |
|---|---|---|
| 9,025,547 B2 | 5/2015 | Ko et al. |
| 9,148,880 B2 | 9/2015 | Ko et al. |
| 9,455,801 B2 | 9/2016 | Ko et al. |
| 9,590,769 B2 | 3/2017 | Ko et al. |
| 9,615,329 B2 | 4/2017 | Tabet et al. |
| 9,888,493 B2 | 2/2018 | Park et al. |
| 9,992,004 B2 | 6/2018 | Mallik et al. |
| 10,555,210 B2 | 2/2020 | Sun et al. |
| 10,757,664 B2 | 8/2020 | Bhorkar et al. |
| 10,855,402 B2 | 12/2020 | Seo et al. |
| 11,219,048 B2 | 1/2022 | Lei et al. |
| 11,224,056 B2 | 1/2022 | Chakraborty et al. |
| 11,245,498 B2 | 2/2022 | Takeda et al. |
| 11,252,754 B2 | 2/2022 | Babaei et al. |
| 11,297,642 B2 | 4/2022 | Chin et al. |
| 11,330,443 B2 | 5/2022 | Babaei et al. |
| 11,336,400 B2 | 5/2022 | Zhou et al. |
| 11,405,139 B2 | 8/2022 | Tsai |
| 11,411,686 B2 | 8/2022 | Hong et al. |
| 11,469,858 B2 | 10/2022 | Zhu |
| 11,540,311 B2 | 12/2022 | Byun et al. |
| 11,818,768 B2 | 11/2023 | Sengupta et al. |
| 11,973,603 B2 * | 4/2024 | Nunome ............... H04L 1/1861 |
| 12,003,328 B2 * | 6/2024 | Lei ........................ H04L 1/1812 |
| 12,166,594 B2 * | 12/2024 | Lei ........................ H04L 1/1896 |
| 12,218,762 B2 * | 2/2025 | Iyer ....................... H04L 1/1896 |
| 2012/0147734 A1 | 6/2012 | Kim et al. |
| 2013/0028213 A1 | 1/2013 | Ko et al. |
| 2013/0070702 A1 | 3/2013 | Ko et al. |
| 2014/0328281 A1 | 11/2014 | Ko et al. |
| 2014/0362812 A1 | 12/2014 | Ko et al. |
| 2015/0110082 A1 | 4/2015 | Sun et al. |
| 2015/0222396 A1 | 8/2015 | Yan et al. |
| 2015/0326353 A1 | 11/2015 | Ko et al. |
| 2016/0119947 A1 | 4/2016 | Park et al. |
| 2018/0006791 A1 * | 1/2018 | Marinier ........... H04W 52/0216 |
| 2018/0145797 A1 | 5/2018 | Yeo et al. |
| 2018/0270705 A1 | 9/2018 | Sun et al. |
| 2018/0302868 A1 | 10/2018 | Bhorkar et al. |
| 2018/0317213 A1 | 11/2018 | Islam et al. |
| 2019/0245655 A1 | 8/2019 | Seo et al. |
| 2019/0342037 A1 | 11/2019 | Karaki et al. |
| 2019/0364592 A1 * | 11/2019 | Bhattad ................. H04L 1/1896 |
| 2020/0014495 A1 * | 1/2020 | Niu ....................... H04W 72/23 |
| 2020/0146034 A1 | 5/2020 | Bagheri et al. |
| 2020/0146054 A1 | 5/2020 | Jeon et al. |
| 2020/0154469 A1 | 5/2020 | Chin et al. |
| 2020/0169903 A1 | 5/2020 | Takeda et al. |
| 2020/0169987 A1 | 5/2020 | Chen et al. |
| 2020/0169994 A1 | 5/2020 | Papasakellariou |
| 2020/0196335 A1 | 6/2020 | Lei et al. |
| 2020/0220663 A1 | 7/2020 | Tsai |
| 2020/0220693 A1 | 7/2020 | Babaei et al. |
| 2020/0221310 A1 | 7/2020 | Babaei et al. |
| 2020/0259601 A1 | 8/2020 | Zhou et al. |
| 2021/0014881 A1 | 1/2021 | Aiba et al. |
| 2021/0050947 A1 * | 2/2021 | Tsai ...................... H04W 72/23 |
| 2021/0075555 A1 | 3/2021 | Zhu |
| 2021/0105097 A1 | 4/2021 | Hong et al. |
| 2021/0160016 A1 | 5/2021 | Takeda et al. |
| 2021/0219329 A1 | 7/2021 | Zhou et al. |
| 2021/0266876 A1 | 8/2021 | Zhou et al. |
| 2021/0274568 A1 | 9/2021 | Sengupta et al. |
| 2021/0289539 A1 | 9/2021 | Byun et al. |
| 2021/0314983 A1 | 10/2021 | Karaki et al. |
| 2021/0336727 A1 * | 10/2021 | Miao ..................... H04L 1/1819 |
| 2021/0345366 A1 | 11/2021 | Ying et al. |
| 2021/0410166 A1 | 12/2021 | Shrestha et al. |
| 2022/0039128 A1 | 2/2022 | Bagheri et al. |
| 2022/0052790 A1 * | 2/2022 | Lei ........................ H04L 5/0053 |
| 2022/0069950 A1 * | 3/2022 | Nunome ............... H04L 1/1861 |
| 2022/0116152 A1 * | 4/2022 | Iyer ....................... H04L 1/1819 |
| 2022/0278774 A1 | 9/2022 | Zhu et al. |
| 2022/0368475 A1 * | 11/2022 | Lei ........................ H04L 1/1822 |
| 2022/0416952 A1 | 12/2022 | Zhu |
| 2024/0243856 A1 * | 7/2024 | Nunome ............... H04L 1/1861 |
| 2025/0132866 A1 * | 4/2025 | Iyer ......................... H04L 1/188 |

FOREIGN PATENT DOCUMENTS

| | | | | |
|---|---|---|---|---|
| CN | 109451798 A | | 3/2019 | |
| CN | 112602280 A | * | 4/2021 | ........... H04L 1/1614 |
| CN | 113302972 A | * | 8/2021 | ........... H04L 1/1854 |
| CN | 112602280 B | * | 10/2024 | ........... H04L 1/1614 |
| CN | 113302972 B | * | 12/2024 | ........... H04L 1/1854 |
| CN | 119276434 A | * | 1/2025 | ........... H04L 1/1614 |
| CN | 119788245 A | * | 4/2025 | ........... H04L 1/1854 |
| EP | 3706349 A1 | | 9/2020 | |
| EP | 3911000 A1 | * | 11/2021 | ........... H04L 1/1854 |
| EP | 4224922 A1 | * | 8/2023 | ........... H04L 1/1854 |
| EP | 3911000 B1 | * | 11/2023 | ........... H04L 1/1854 |
| EP | 4224922 B1 | * | 5/2024 | ........... H04L 1/1854 |
| ES | 2985603 T3 | * | 11/2024 | ........... H04L 1/1854 |
| JP | 7329543 B2 | * | 8/2023 | ........... H04L 1/1854 |
| JP | 2023159133 A | * | 10/2023 | ........... H04L 1/1854 |
| JP | 7528327 B2 | * | 8/2024 | ........... H04L 1/1854 |
| WO | 2013167966 A1 | | 11/2013 | |
| WO | 2015037885 A1 | | 3/2015 | |
| WO | 2018201294 A1 | | 11/2018 | |
| WO | WO-2020033689 A1 | * | 2/2020 | ........... H04L 1/1614 |
| WO | WO-2020144895 A1 | * | 7/2020 | ........... H04L 1/1854 |
| WO | 2021159237 A1 | | 8/2021 | |

OTHER PUBLICATIONS

International Preliminary Report on Patentability—PCT/US2021/019439 The International Bureau of WIPO—Geneva, Switzerland, Sep. 9, 2022.

International Search Report and Written Opinion—PCT/US2021/019439—ISA/EPO—Aug. 12, 2021.

Mediatek Inc: "Remaining Issues on NR-U Configured Grant", 3GPP Draft, 3GPP TSG RAN WG1 #99, R1-1912091, 3rd Generation Partnership Project (3GPP), Mobile Competence Centre, 650, Route Des Lucioles, F-06921 Sophia-Antipolis Cedex, France, vol. Ran WG1, No. Reno, USA, Nov. 18, 2019-Nov. 22, 2019, Nov. 9, 2019 (Nov. 9, 2019), XP051823184, 6 Pages, paragraph [02.2]—paragraph [2.3.1], Sections 2.2-2.4, Table 1.

Nokia, et al., "Multiple Active Configured Grants for NR-U", 3GPP TSG-RAN WG2 Meeting #108, 3GPP Draft, R2-1915887, 3rd Generation Partnership Project (3GPP), Mobile Competence Centre, 650, Route Des Lucioles, F-06921 Sophia-Antipolis Cedex, France, vol. Ran WG2, No. USA, Nov. 18, 2019-Nov. 22, 2019, 2 Pages. Nov. 8, 2019 (Nov. 8, 2019), XP051817456, the whole document.

Partial International Search Report—PCT/US2021/019439—ISA/EPO—May 14, 2021.

SAMSUNG: "Scheduling of Multiple Transport Blocks for MTC", 3GPP TSG RAN WG1 Meeting #98, R1-1908445, 3rd Generation Partnership Project, Mobile Competence Centre, 650, Route Des Lucioles, F-06921 Sophia-Antipolis Cedex, France, vol. Ran WG1, No. Prague, CZ, Aug. 26, 2019-Aug. 30, 2019, Aug. 16, 2019, pp. 1-5, XP051765054, p. 2, Penultimate Par. Above Proposal 5 on p. 3.

Sony: "On Scheduling of Multiple DL/UL Transport Blocks", 3GPP TSG RAN WG1 #98bis, 3GPP Draft, R1-1910739 MTBG V1, 3rd Generation Partnership Project (3GPP), Mobile Competence Centre, 650, Route Des Lucioles, F-06921 Sophia-Antipolis Cedex, France, vol. Ran WG1, No. Chongqing, PR China, Oct. 14, 2019-Oct. 18, 2019, Oct. 4, 2019, 13 Pages, XP051808688, p. 5-p. 7, figures 2-4.

(56) References Cited

OTHER PUBLICATIONS

Vivo: "Feature Lead Summary on Configured Grant Enhancement", 3GPP TSG RAN WG1#98, 3GPP Draft, R1-1909476, 3rd Generation Partnership Project (3GPP), Mobile Competence Centre, 650, Route Des Lucioles, F-06921 Sophia-Antipolis Cedex, France, vol. Ran WG1, No. Prague, CZ, Aug. 26, 2019-Aug. 30, 2019, Sep. 3, 2019 (Sep. 3, 2019), XP051766078, 14 Pages, paragraph [0002]—paragraph [0004], p. 3.

Sony: "On Scheduling of Multiple DL / UL Transport Blocks", R1-1910739, 3GPP TSG RAN WG1 #98bis Chongqing, PR China, Oct. 14-18, 2019, 13 Pages.

\* cited by examiner

CONSOLIDATED FEEDBACK INDICATION AND FEEDBACK TRANSMISSION

CROSS-REFERENCE TO RELATED APPLICATION

This application is a continuation of U.S. patent application Ser. No. 17/182,969, filed Feb. 23, 2021 (now U.S. Pat. No. 12,016,027), entitled "CONSOLIDATED FEEDBACK INDICATION AND FEEDBACK TRANSMISSION," which claims priority to U.S. Provisional Patent Application No. 62/981,492, filed on Feb. 25, 2020, entitled "CONSOLIDATED FEEDBACK INDICATION AND FEEDBACK TRANSMISSION," the contents of which are incorporated herein by reference in their entireties.

FIELD OF THE DISCLOSURE

Aspects of the present disclosure generally relate to wireless communication and to techniques and apparatuses for consolidated feedback indication and feedback transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, in a downlink control information, a bit map identifying a plurality of feedback indicators for a plurality of uplink transmissions, wherein the plurality of feedback indicators includes more than one acknowledgment and/or negative acknowledgment; and retransmitting one or more of the plurality of uplink transmissions based at least in part on receiving the bit map identifying the plurality of feedback indicators.

In some aspects, a method of wireless communication, performed by a UE, may include identifying a failure associated with a plurality of uplink transmissions associated with a plurality of uplink transmission occasions; and retransmitting the plurality of uplink transmissions using a subsequent single uplink transmission.

In some aspects, a UE for wireless communication may include a memory and one or more processors operatively coupled to the memory. The memory and the one or more processors may be configured to receive, in a downlink control information, a bit map identifying a plurality of feedback indicators for a plurality of uplink transmissions, wherein the plurality of feedback indicators includes more than one acknowledgment and/or negative acknowledgment; and retransmit one or more of the plurality of uplink transmissions based at least in part on receiving the bit map identifying the plurality of feedback indicators.

In some aspects, a UE for wireless communication may include a memory and one or more processors operatively coupled to the memory. The memory and the one or more processors may be configured to identify a failure associated with a plurality of uplink transmissions associated with a plurality of uplink transmission occasions; and retransmit the plurality of uplink transmissions using a subsequent single uplink transmission.

In some aspects, a non-transitory computer-readable medium may store one or more instructions for wireless communication. The one or more instructions, when executed by one or more processors of a UE, may cause the one or more processors to receive, in a downlink control information, a bit map identifying a plurality of feedback indicators for a plurality of uplink transmissions, wherein the plurality of feedback indicators includes more than one acknowledgment and/or negative acknowledgment; and retransmit one or more of the plurality of uplink transmissions based at least in part on receiving the bit map identifying the plurality of feedback indicators.

In some aspects, a non-transitory computer-readable medium may store one or more instructions for wireless communication. The one or more instructions, when executed by one or more processors of a UE, may cause the one or more processors to identify a failure associated with a plurality of uplink transmissions associated with a plurality of uplink transmission occasions; and retransmit the plurality of uplink transmissions using a subsequent single uplink transmission.

In some aspects, an apparatus for wireless communication may include means for receiving, in a downlink control information, a bit map identifying a plurality of feedback indicators for a plurality of uplink transmissions, wherein the plurality of feedback indicators includes more than one acknowledgment and/or negative acknowledgment; and means for retransmitting one or more of the plurality of uplink transmissions based at least in part on receiving the bit map identifying the plurality of feedback indicators.

In some aspects, an apparatus for wireless communication may include means for identifying a failure associated with a plurality of uplink transmissions associated with a plurality of uplink transmission occasions; and means for retransmitting the plurality of uplink transmissions using a subsequent single uplink transmission.

In some aspects, a method of wireless communication, performed by a user equipment (UE), may include receiving, in a downlink control information, a bit map identifying a plurality of feedback indicators for a plurality of uplink transmissions, wherein the plurality of feedback indicators includes at least one acknowledgment or negative acknowledgment; and retransmitting one or more of the plurality of uplink transmissions based at least in part on receiving the bit map identifying the plurality of feedback indicators.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
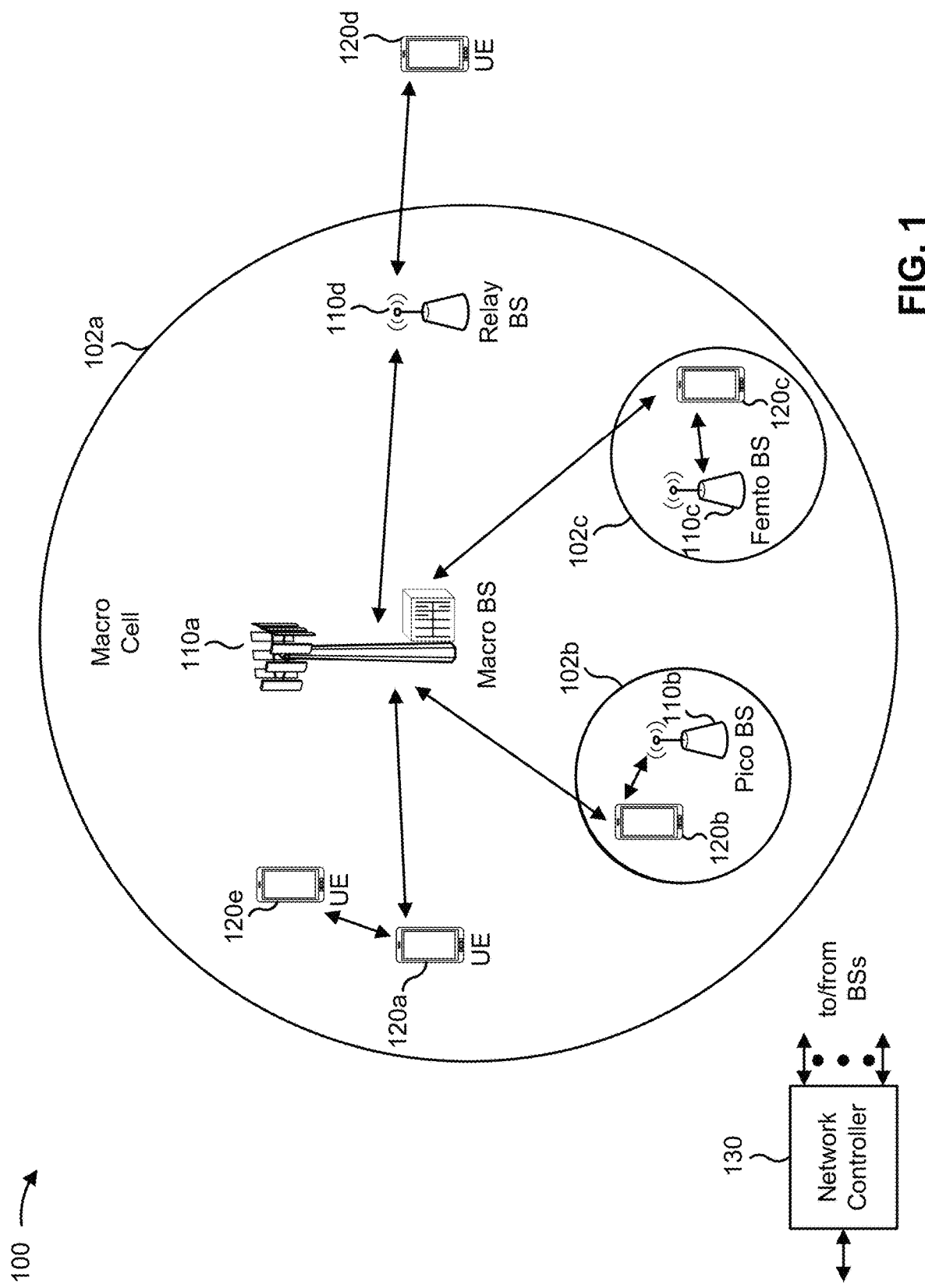
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHZ-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
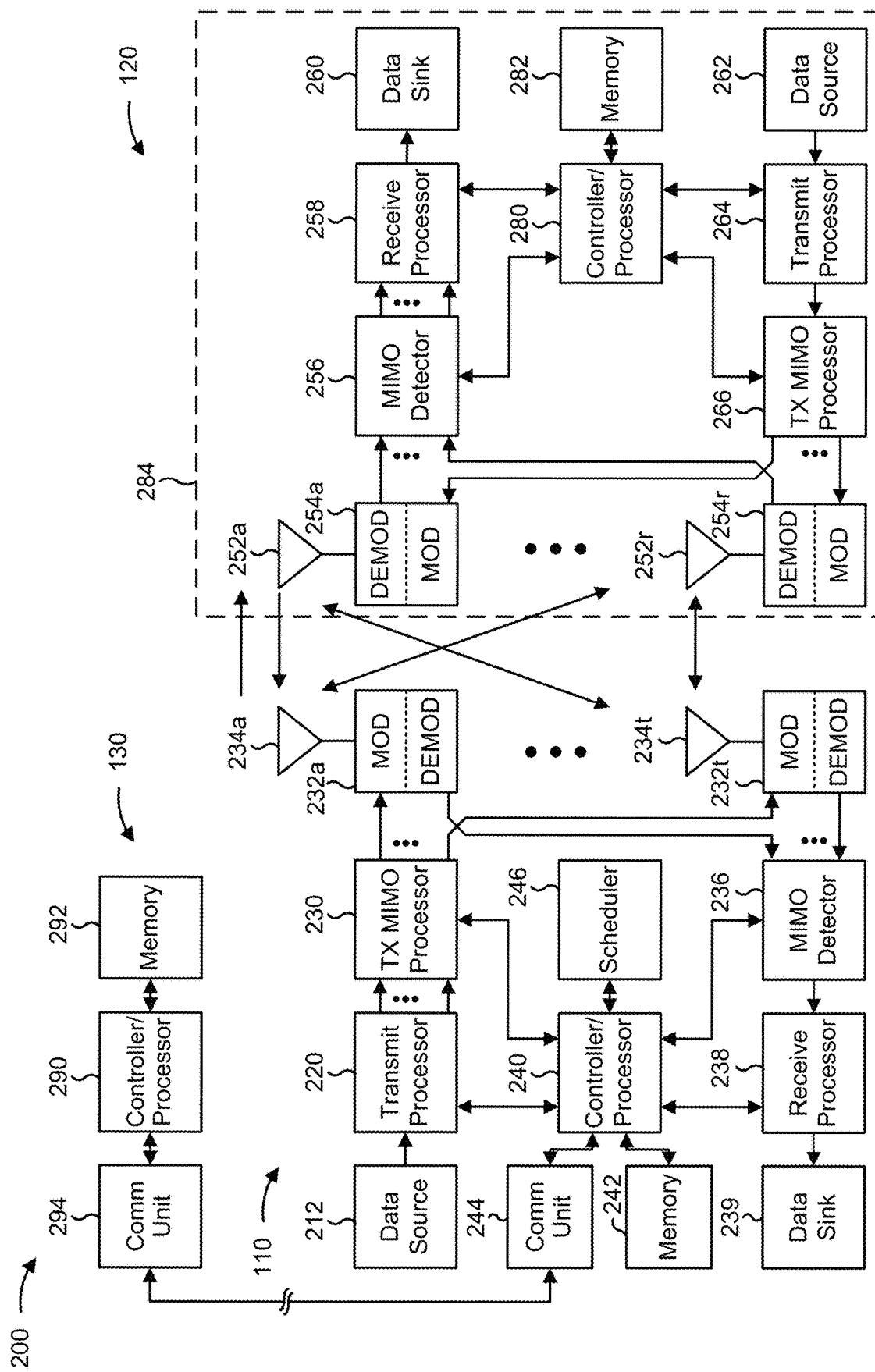
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols.

Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3A-5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3A-5.

Controller/processor 240 of base station 110, controller/processor 280 of UE 120, and/or any other component(s) of FIG. 2 may perform one or more techniques associated with consolidated feedback indication, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, UE 120 may include means for receiving (e.g., using antenna 252, DEMOD 254, MIMO detector 256, receive processor 258, controller/processor 280, memory 282, and/or the like), in a downlink control information, a bit map identifying a plurality of feedback indicators for a plurality of uplink transmissions, wherein the plurality of feedback indicators includes more than one acknowledgment and/or negative acknowledgment, means for retransmitting (e.g., using controller/processor 280, transmit processor 264, TX MIMO processor 266, MOD 254, antenna 252, and/or the like) one or more of the plurality of uplink transmissions based at least in part on receiving the bit map identifying the plurality of feedback indicators, and/or the like. In some aspects, UE 120 may include means for identifying (e.g., using controller/processor 280) a failure associated with a plurality of uplink transmissions associated with a plurality of uplink transmission occasions, means for retransmitting (e.g., using controller/processor 280, transmit processor 264, TX MIMO processor 266, MOD 254, antenna 252, and/or the like) the plurality of uplink transmissions using a subsequent single uplink transmission, and/or the like. In some aspects, such means may include one or more components of UE 120 described in connection with FIG. 2.

As indicated above, FIG. 2 is provided as an example. Other examples may differ from what is described with regard to FIG. 2.

In some communication systems, a UE may transmit an uplink transmission and monitor to receive feedback information indicating whether the uplink transmission is received. For example, the UE may transmit a physical uplink shared channel (PUSCH) communication, during a PUSCH occasion, toward a BS and may monitor to receive a downlink control information (DCI) from the BS indicating whether the PUSCH communication was successfully received. When at least a portion of the PUSCH communication is not successfully received, the BS may transmit a DCI scheduling a retransmission of the PUSCH communication. For example, the BS may transmit the DCI for a particular hybrid automatic repeat request (HARQ) identifier associated with the PUSCH communication. In some cases, such as when the PUSCH communication is associated with multiple code block groups (CBGs) in each transport block, the DCI may include information indicating which CBGs are to be retransmitted. However, transmitting a DCI for each HARQ identifier may result in an excessive utilization of network resources.

Some aspects described herein enable consolidation of feedback information. For example, the BS may consolidate feedback information for a plurality of HARQ identifiers associated with a plurality of PUSCH communications into a single DCI. In this case, the UE may receive the single DCI and may retransmit a plurality of PUSCH communications and/or a plurality of CBGs thereof based at least in part on the feedback information. In this way, the BS and the UE may reduce a utilization of network resources. Additionally, or alternatively, the UE may consolidate a plurality of transmissions (e.g., a plurality of HARQ retransmissions) into a single uplink transmission. In this way, the UE may further reduce a utilization of network resources relative to transmitting a plurality of retransmissions.

Figure 3A:
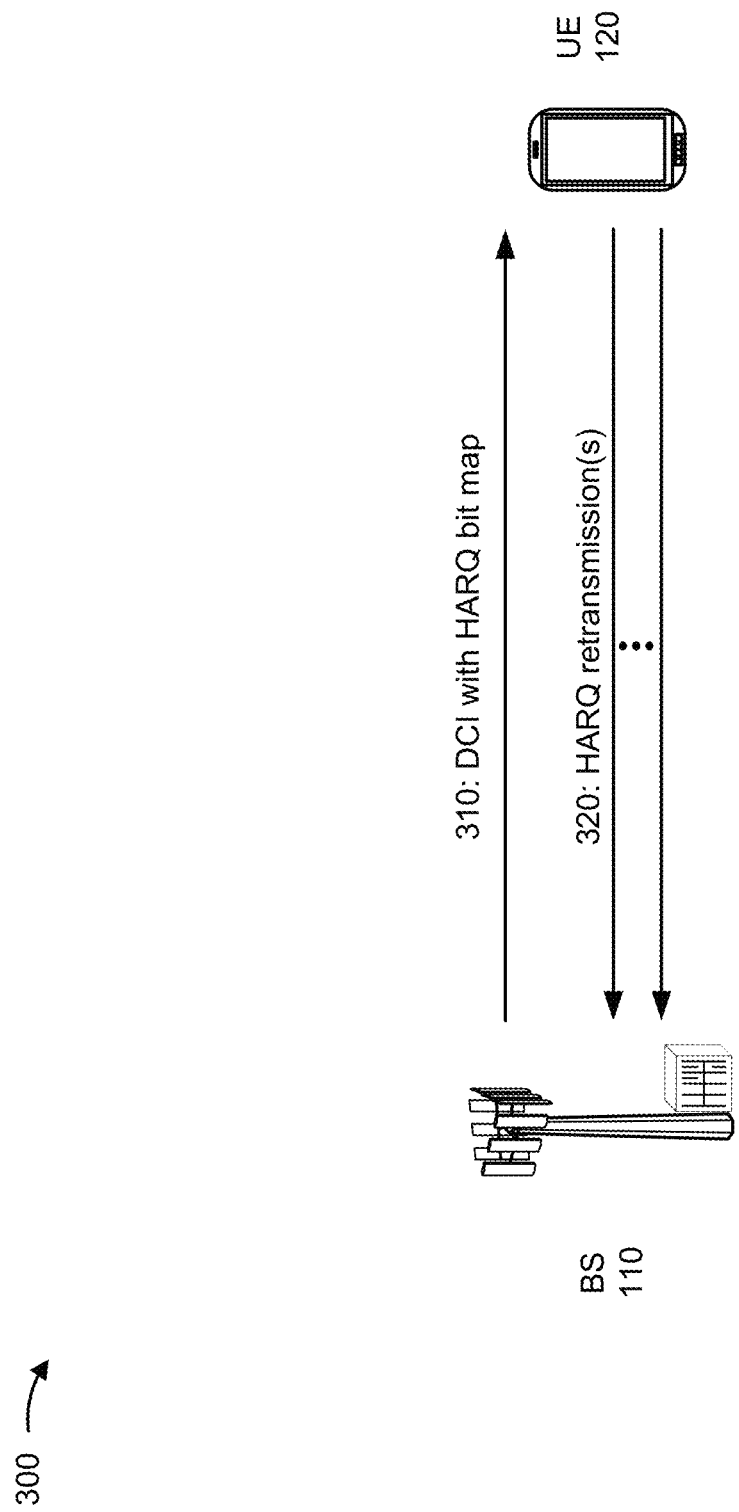
FIGS. 3A-3B are diagrams illustrating examples associated with consolidated feedback indication and feedback transmission, in accordance with the present disclosure.
Figure 3B:
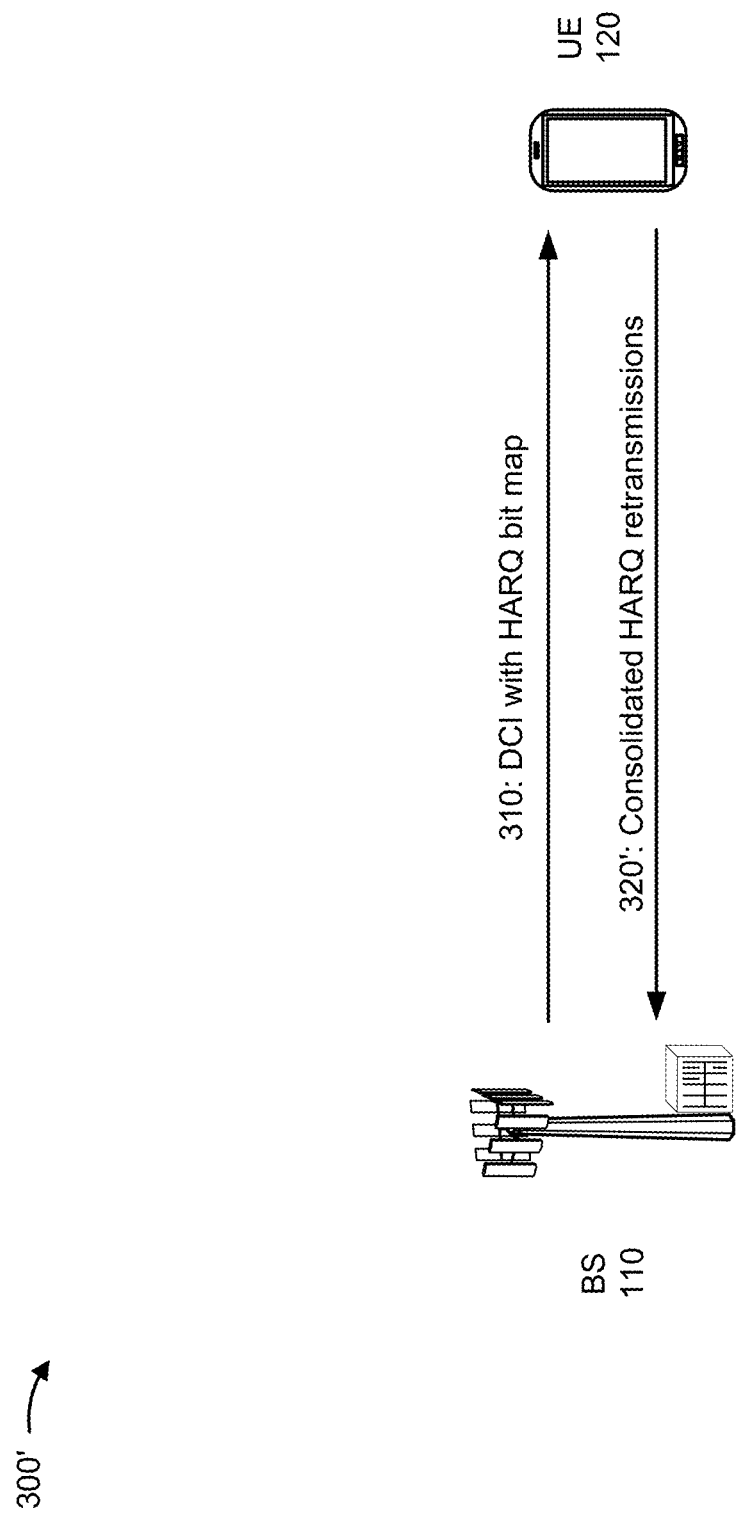

FIGS. 3A and 3B are diagrams illustrating examples 300/300' of consolidated feedback indication and feedback transmission, in accordance with the present disclosure. As shown in FIGS. 3A and 3B, examples 300/300' may include a BS 110 and a UE 120.

As further shown in FIG. 3A, and by reference number 310, UE 120 may receive feedback information. For example, UE 120 may receive a DCI with a HARQ bit map to identify HARQ feedback for a plurality of PUSCH transmission occasions. In this case, the plurality of PUSCH transmission occasions may be configured grant PUSCH occasions, dynamic grant PUSCH occasions, a combination of configured grant PUSCH occasions and dynamic grant PUSCH occasions, and/or the like. In some aspects, UE 120 may identify a plurality of acknowledgment messages (ACKs) and/or negative acknowledgment messages (NACKs) based at least on the DCI. For example, UE 120 may receive a single DCI with a plurality of bits to identify one or more ACKs, one or more NACKs, a combination of one or more ACKs and one or more NACKs, and/or the like. In some aspects, UE 120 may identify feedback information for PUSCH transmission occasions with different HARQ identifiers. For example, UE 120 may identify a first set of bits of a bit map in the DCI that relate to a first set of PUSCH transmission occasions with a first set of HARQ identifiers and a second set of bits of the bit map in the DCI that relate to a second set of PUSCH transmission occasions with a second set of HARQ identifiers.

In some aspects, UE 120 may identify feedback information for one or more transport blocks and/or CBGs for a PUSCH transmission occasion. For example, when a PUSCH transmission occasion has a plurality of transport blocks and/or a plurality of CBGs in each transport block, UE 120 may identify a plurality of bits in the bit map of the DCI corresponding to the plurality of transport blocks and/or the plurality of CBGs.

In some aspects, UE 120 may receive a DCI indicating that no retransmission of failed communications is to be performed. For example, UE 120 may receive a DCI with a set of bits indicating a set of ACKs for a set of PUSCH transmission occasions. In this case, UE 120 may determine to use a next configured grant PUSCH transmission occasion for a new data transmission rather than for a HARQ retransmission. In some aspects, UE 120 may receive an indicator of a dynamic grant for a HARQ retransmission. For example, when the DCI includes an indicator of a NACK, the DCI may include information identifying dynamic grant resources for a HARQ retransmission of a failed PUSCH transmission occasion corresponding to the NACK.

As further shown in FIG. 3A, and by reference number 320, UE 120 may transmit one or more HARQ retransmissions. For example, UE 120 may transmit a plurality of HARQ retransmissions based at least in part on receiving a plurality of indicators of NACKs in the DCI. Additionally, or alternatively, as shown in FIG. 3B, and by reference number 320', UE 120 may consolidate a plurality of HARQ retransmissions into a single HARQ retransmission. For example, UE 120 may retransmit a plurality of failed transport blocks and/or configured grants (CGs) via a single configured grant PUSCH transmission occasion. In some aspects, UE 120 may retransmit in a next available configured grant PUSCH transmission occasion. For example, UE 120 may retransmit in any configured grant PUSCH transmission occasion occurring after receiving the DCI. Additionally, or alternatively, UE 120 may retransmit in a next configured grant PUSCH transmission occasion that is associated with an indicated subset of configured grant configuration identifiers. For example, UE 120 may retransmit in a configured grant PUSCH transmission occasion that has a different configured grant configuration identifier than any failed transmission indicated in the DCI.

In some aspects, UE 120 may transmit one or more HARQ retransmissions using a particular set of operation parameters. For example, UE 120 may use a beam, modulation and coding scheme, and/or the like identified by the DCI. Additionally, or alternatively, UE 120 may use an operation parameter, in a next configured grant PUSCH transmission occasion, of a previous transmission for which a failure triggered the one or more HARQ retransmissions. In some aspects, UE 120 may determine that an allocation of a next configured grant PUSCH transmission occasion is smaller than a quantity of resources for retransmitting the one or more HARQ retransmissions. In this case, UE 120 may scale up the configured grant PUSCH transmission occasion to a size with enough resources to retransmit all of the one or more HARQ retransmissions identified by the DCI. Additionally, or alternatively, UE 120 may increase a modulation and coding scheme to retransmit all of the one or more HARQ retransmissions in a single configured grant PUSCH transmission occasion.

Additionally, or alternatively, UE 120 may maintain a size and modulation and coding scheme of the configured grant PUSCH transmission occasion. In this case, UE 120 may transmit a first subset of the one or more HARQ retransmissions in a first configured grant PUSCH occasion and one or more second subsets of the one or more HARQ retransmissions in one or more second configured grant PUSCH occasions.

In some aspects, UE 120 may use a dynamic grant PUSCH transmission occasion for one or more HARQ retransmissions. For example, when UE 120 receives a DCI identifying dynamic grant PUSCH transmission resources, UE 120 may use the dynamic grant PUSCH transmission resources for one or more HARQ retransmissions. Additionally, or alternatively, UE 120 may use resources of both a configured grant and a dynamic grant. For example, when the one or more HARQ retransmissions cannot be transmitted in resources of a single grant, UE 120 may use resources of both a configured grant and a dynamic grant. Alternatively, UE 120 may use resources of a first arriving grant. For example, when resources of the dynamic grant are scheduled before resources of the configured grant, UE 120 may transmit the one or more HARQ retransmissions using the resources of the dynamic grant.

As indicated above, FIGS. 3A and 3B are provided as an example. Other examples may differ from what is described with respect to FIGS. 3A and 3B.

Figure 4:
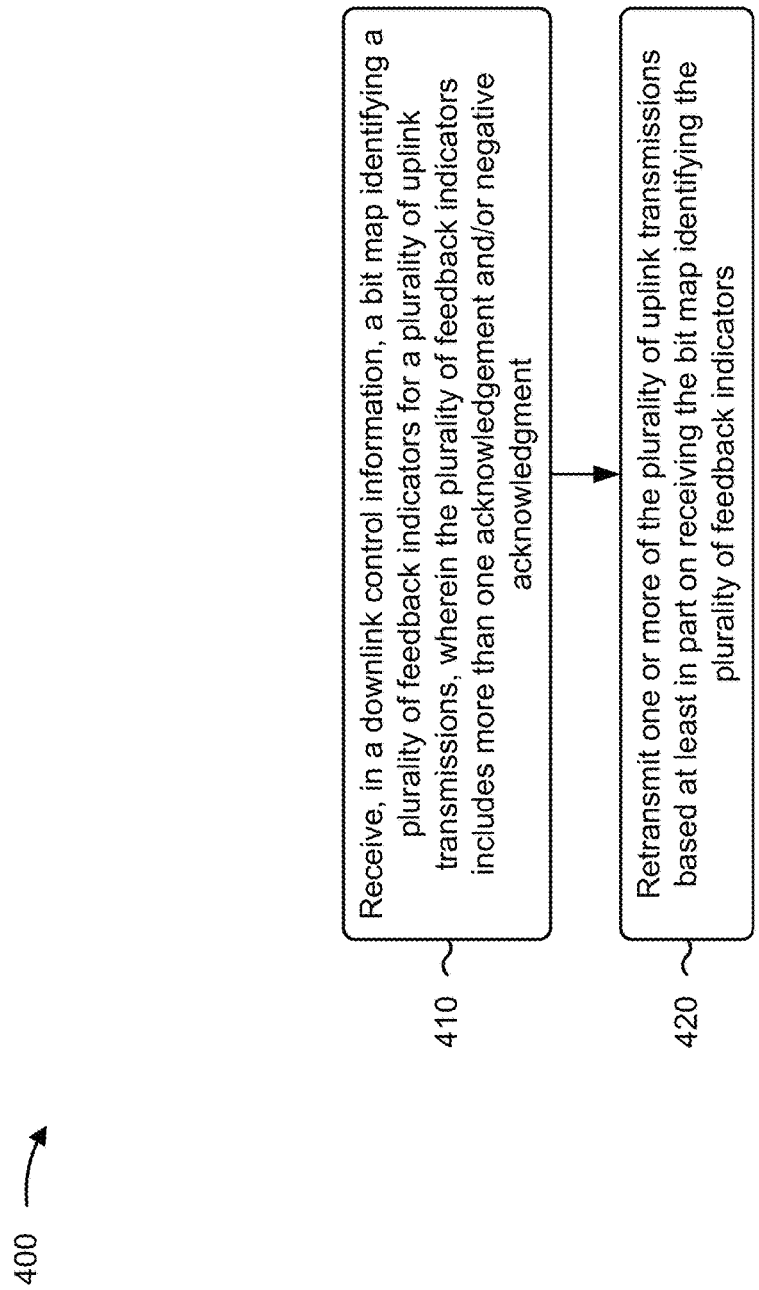
FIGS. 4-5 are diagrams illustrating example processes associated with consolidated feedback indication and feedback transmission, in accordance with the present disclosure.

FIG. 4 is a diagram illustrating an example process 400 performed, for example, by a UE, in accordance with the present disclosure. Example process 400 is an example where the UE (e.g., UE 120 and/or the like) performs operations associated with consolidated feedback indication.

As shown in FIG. 4, in some aspects, process 400 may include receiving, in a downlink control information, a bit map identifying a plurality of feedback indicators for a plurality of uplink transmissions, wherein the plurality of feedback indicators includes more than one acknowledgment and/or negative acknowledgment (block 410). That is, the plurality of feedback indicators includes more than one feedback indicator, where the more than one feedback indicator can include, for example, any number of ACKs and any number of NACKs. For example, the UE (e.g., using receive processor 258, transmit processor 264, controller/processor 280, memory 282, and/or the like) may receive, in a downlink control information, a bit map identifying a plurality of feedback indicators for a plurality of uplink transmissions, as described above with reference to FIGS. 3A and 3B. In some aspects, the plurality of feedback indicators includes more than one acknowledgment and/or negative acknowledgment.

As further shown in FIG. 4, in some aspects, process 400 may include retransmitting one or more of the plurality of uplink transmissions based at least in part on receiving the bit map identifying the plurality of feedback indicators (block 420). For example, the UE (e.g., using receive processor 258, transmit processor 264, controller/processor 280, memory 282, and/or the like) may retransmit one or more of the plurality of uplink transmissions based at least in part on receiving the bit map identifying the plurality of feedback indicators, as described above with reference to FIGS. 3A and 3B.

Process 400 may include additional aspects, such as any single aspect or any combination of aspects described below and/or in connection with one or more other processes described elsewhere herein.

In a first aspect, the plurality of feedback indicators corresponds to a plurality of physical uplink shared channel transmission occasions with a plurality of different hybrid automatic repeat request identifiers.

In a second aspect, alone or in combination with the first aspect, the bit map includes a first region including a first subset of the plurality of feedback indicators for a first physical uplink shared channel occasion and a second region including a second subset of the plurality of feedback indicators for a second physical uplink shared channel occasion.

In a third aspect, alone or in combination with one or more of the first and second aspects, an arrangement of bits in the bit map is based at least in part on a corresponding order of the plurality of uplink transmissions with respect to at least one of: transmission time, transmission frequency, hybrid automatic repeat request identifier, scheduling message time, or scheduling message frequency.

In a fourth aspect, alone or in combination with one or more of the first through third aspects, a first bit of the bit map corresponds to a first transport block of an uplink transmission of the plurality of uplink transmissions and a second bit of the bit map corresponds to a second transport block of the uplink transmission.

In a fifth aspect, alone or in combination with one or more of the first through fourth aspects, a first bit of the bit map corresponds to a first code block group of an uplink transmission of the plurality of uplink transmissions and a second bit of the bit map corresponds to a second code block group of the uplink transmission.

In a sixth aspect, alone or in combination with one or more of the first through fifth aspects, the plurality of uplink transmissions is a plurality of configured grant uplink transmissions.

In a seventh aspect, alone or in combination with one or more of the first through sixth aspects, the plurality of uplink transmissions is a plurality of dynamic grant uplink transmissions.

In an eighth aspect, alone or in combination with one or more of the first through seventh aspects, the plurality of uplink transmissions includes one or more configured grant uplink transmissions and one or more dynamic grant uplink transmissions.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
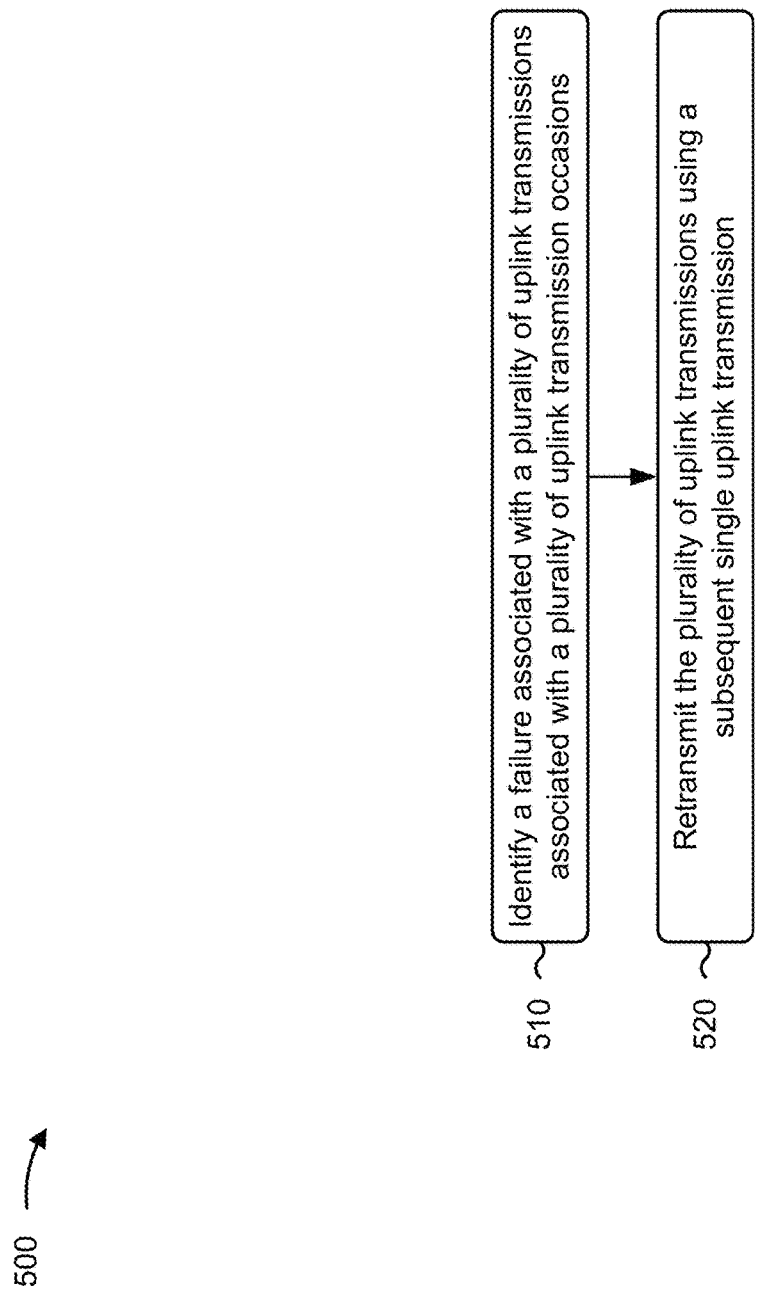

FIG. 5 is a diagram illustrating an example process 500 performed, for example, by a UE, in accordance with the present disclosure. Example process 500 is an example where the UE (e.g., UE 120 and/or the like) performs operations associated with consolidated feedback transmission.

As shown in FIG. 5, in some aspects, process 500 may include identifying a failure associated with a plurality of uplink transmissions associated with a plurality of uplink transmission occasions (block 510). For example, the UE (e.g., using receive processor 258, transmit processor 264, controller/processor 280, memory 282, and/or the like) may identify a failure associated with a plurality of uplink transmissions associated with a plurality of uplink transmission occasions, as described above with reference to FIGS. 3A and 3B.

As further shown in FIG. 5, in some aspects, process 500 may include retransmitting the plurality of uplink transmissions using a subsequent single uplink transmission (block 520). For example, the UE (e.g., using receive processor 258, transmit processor 264, controller/processor 280, memory 282, and/or the like) may retransmit the plurality of uplink transmissions using a subsequent single uplink transmission, as described above with reference to FIGS. 3A and 3B.

Process 500 may include additional aspects, such as any single aspect or any combination of aspects described below and/or in connection with one or more other processes described elsewhere herein.

In a first aspect, the plurality of uplink transmissions associated with the plurality of uplink transmission occasions is a plurality of physical uplink shared channel transmissions associated with a plurality of physical uplink shared channel occasions.

In a second aspect, alone or in combination with the first aspect, the plurality of uplink transmissions is associated with a plurality of different hybrid automatic repeat request identifiers.

In a third aspect, alone or in combination with one or more of the first and second aspects, the subsequent single uplink transmission is a next configured grant occasion.

In a fourth aspect, alone or in combination with one or more of the first through third aspects, the subsequent single uplink transmission is a next configured grant occasion associated with one of a subset of configured grant configuration identifiers.

In a fifth aspect, alone or in combination with one or more of the first through fourth aspects, the subset of configured grant configuration identifiers includes one or more configured grant configuration identifiers of the plurality of uplink transmissions.

In a sixth aspect, alone or in combination with one or more of the first through fifth aspects, the subset of configured grant configuration identifiers excludes one or more configured grant configuration identifiers of the plurality of uplink transmissions.

In a seventh aspect, alone or in combination with one or more of the first through sixth aspects, process 500 includes receiving a feedback message with one or more bits identifying the failure associated with the plurality of uplink transmissions, wherein the feedback is messaging that does not include one or more operation parameters for the subsequent single uplink transmission; and using one or more stored operation parameters for the subsequent single uplink transmission.

In an eighth aspect, alone or in combination with one or more of the first through seventh aspects, process 500 includes receiving a feedback message with one or more bits identifying the failure associated with the plurality of uplink transmissions, wherein the feedback is messaging that includes one or more operation parameters for the subsequent single uplink transmission; and using the one or more operation parameters for the subsequent single uplink transmission.

In a ninth aspect, alone or in combination with one or more of the first through eighth aspects, the plurality of uplink transmissions is associated with a greater resource allocation than the subsequent single uplink transmission, and process 500 includes scaling a configured grant resource allocation of the subsequent single uplink transmission to accommodate the plurality of uplink transmissions.

In a tenth aspect, alone or in combination with one or more of the first through ninth aspects, the plurality of uplink transmissions is associated with a greater resource allocation than the subsequent single uplink transmission, and process 500 includes increasing a modulation and coding scheme of the subsequent single uplink transmission to accommodate the plurality of uplink transmissions.

In an eleventh aspect, alone or in combination with one or more of the first through tenth aspects, the plurality of uplink transmissions is associated with a greater resource allocation than the subsequent single uplink transmission, and process 500 includes splitting the plurality of uplink transmissions into a first subset of information for transmission using the subsequent single uplink transmission and a second subset of information for transmission using another subsequent uplink transmission.

In a twelfth aspect, alone or in combination with one or more of the first through eleventh aspects, process 500 includes receiving a downlink control information including one or more bits identifying the failure associated with the plurality of uplink transmissions, wherein the downlink control information includes a dynamic grant for retransmission of one or more failed transport blocks or code block groups.

In a thirteenth aspect, alone or in combination with one or more of the first through twelfth aspects, process 500 includes selecting whether to transmit using a configured grant or the dynamic grant based at least in part on an order of the configured grant and the dynamic grant.

In a fourteenth aspect, alone or in combination with one or more of the first through thirteenth aspects, process 500 includes receiving a downlink control information including one or more bits identifying the failure associated with the plurality of uplink transmissions, wherein the downlink control information includes a scheduling information for retransmission of one or more failed transport blocks or code block groups.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
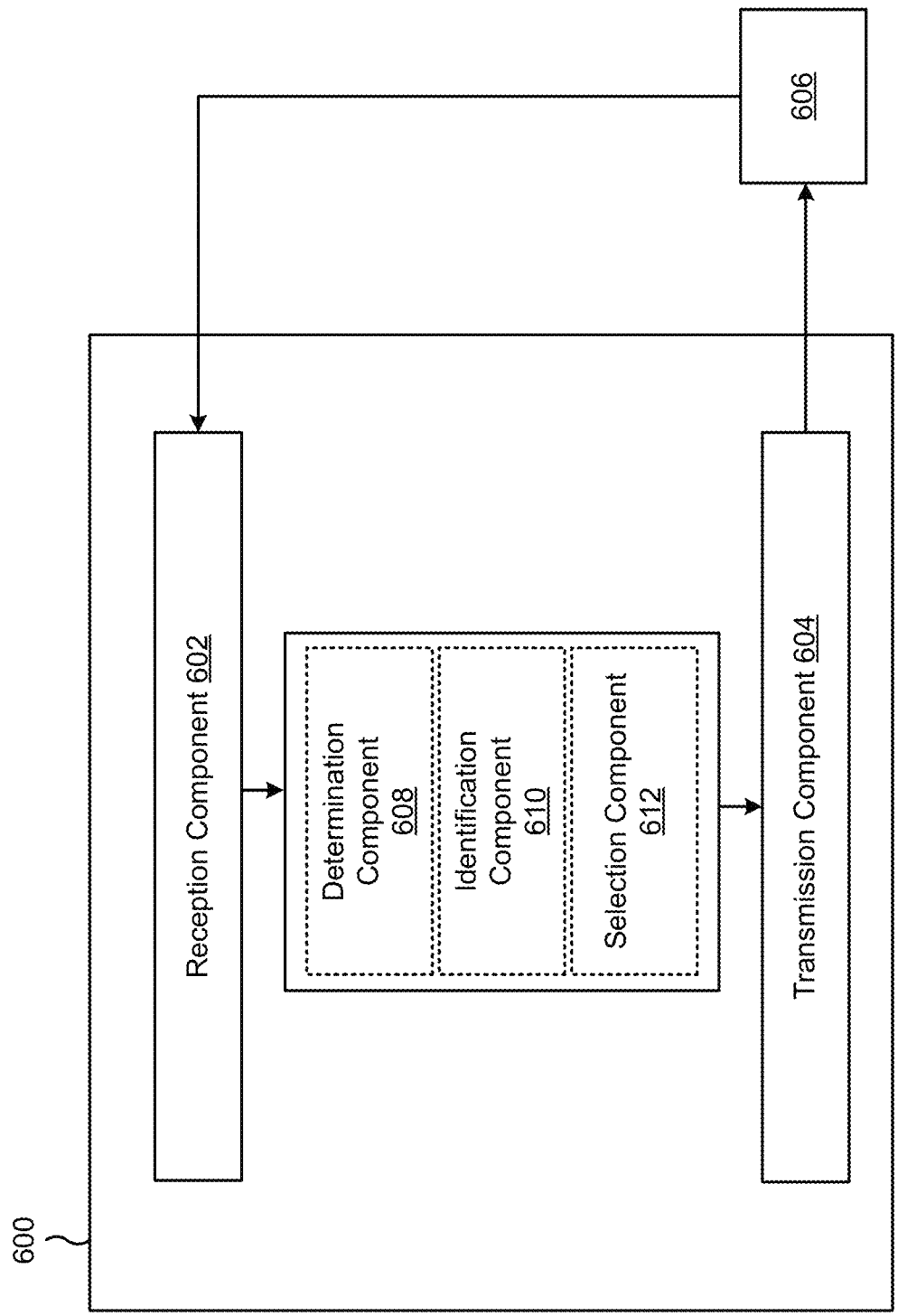
FIG. 6 is a block diagrams of an example apparatus for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a determination component 608, an identification component 610, or a selection component 612, among other examples.

In some aspects, the apparatus 600 may be configured to perform one or more operations described herein in connection with FIGS. 3A-3B. Additionally, or alternatively, the apparatus 600 may be configured to perform one or more processes described herein, such as process 400 of FIG. 4, process 500 of FIG. 5, and/or a combination thereof. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive, in a downlink control information, a bit map identifying a plurality of feedback indicators for a plurality of uplink transmissions, wherein the plurality of feedback indicators includes more than one acknowledgment and/or negative acknowledgment. The transmission component 604 may retransmit one or more of the plurality of uplink transmissions based at least in part on receiving the bit map identifying the plurality of feedback indicators. The determination component 608 may determine whether to retransmit an uplink transmission based at least in part on a content of the bit map.

The identification component 610 may identify a failure associated with a plurality of uplink transmissions associated with a plurality of uplink transmission occasions. The transmission component 604 may retransmit the plurality of uplink transmissions using a subsequent single uplink transmission.

The reception component 602 may receive a feedback message with one or more bits identifying the failure associated with the plurality of uplink transmissions, wherein the feedback message does not include one or more operation parameters for the subsequent single uplink transmission. The transmission component 604 may use one or more stored operation parameters for the subsequent single uplink transmission.

The reception component 602 may receive a feedback message with one or more bits identifying the failure associated with the plurality of uplink transmissions, wherein the feedback message includes one or more operation parameters for the subsequent single uplink transmission. The transmission component 604 may use the one or more operation parameters for the subsequent single uplink transmission.

The reception component 602 may receive a downlink control information including one or more bits identifying the failure associated with the plurality of uplink transmissions, wherein the downlink control information includes a dynamic grant for retransmission of one or more failed transport blocks or code block groups.

The selection component 612 may select whether to transmit using a configured grant or the dynamic grant based at least in part on an order of the configured grant and the dynamic grant.

The reception component 602 may receive a downlink control information including one or more bits identifying the failure associated with the plurality of uplink transmissions, wherein the downlink control information includes a scheduling information for retransmission of one or more failed transport blocks or code block groups.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some aspects of the present disclosure:

Aspect 1: A method of wireless communication performed by a user equipment (UE), comprising: receiving, in a downlink control information, a bit map identifying a plurality of feedback indicators for a plurality of uplink transmissions, wherein the plurality of feedback indicators includes more than one acknowledgment and/or negative acknowledgment; and retransmitting one or more of the plurality of uplink transmissions based at least in part on receiving the bit map identifying the plurality of feedback indicators.

Aspect 2: The method of aspect 1, wherein the plurality of feedback indicators corresponds to a plurality of physical uplink shared channel transmission occasions with a plurality of different hybrid automatic repeat request identifiers.

Aspect 3: The method of any of aspects 1 to 2, wherein the bit map includes a first region including a first subset of the plurality of feedback indicators for a first physical uplink shared channel occasion and a second region including a second subset of the plurality of feedback indicators for a second physical uplink shared channel occasion.

Aspect 4: The method of any of aspects 1 to 3, wherein an arrangement of bits in the bit map is based at least in part on a corresponding order of the plurality of uplink transmissions with respect to at least one of: transmission time, transmission frequency, hybrid automatic repeat request identifier, scheduling message time, or scheduling message frequency.

Aspect 5: The method of any of aspects 1 to 4, wherein a first bit of the bit map corresponds to a first transport block of an uplink transmission of the plurality of uplink transmissions and a second bit of the bit map corresponds to a second transport block of the uplink transmission.

Aspect 6: The method of any of aspects 1 to 5, wherein a first bit of the bit map corresponds to a first code block group of an uplink transmission of the plurality of uplink transmissions and a second bit of the bit map corresponds to a second code block group of the uplink transmission.

Aspect 7: The method of any of aspects 1 to 6, wherein the plurality of uplink transmissions is a plurality of configured grant uplink transmissions.

Aspect 8: The method of any of aspects 1 to 7, wherein the plurality of uplink transmissions is a plurality of dynamic grant uplink transmissions.

Aspect 9: The method of any of aspects 1 to 8, wherein the plurality of uplink transmissions includes one or more configured grant uplink transmissions and one or more dynamic grant uplink transmissions.

Aspect 10: A method of wireless communication performed by a user equipment (UE), comprising: identifying a failure associated with a plurality of uplink transmissions associated with a plurality of uplink transmission occasions; and retransmitting the plurality of uplink transmissions using a subsequent single uplink transmission.

Aspect 11: The method of aspect 10, wherein the plurality of uplink transmissions associated with the plurality of uplink transmission occasions is a plurality of physical uplink shared channel transmissions associated with a plurality of physical uplink shared channel occasions.

Aspect 12: The method of any of aspects 10 to 11, wherein the plurality of uplink transmissions is associated with a plurality of different hybrid automatic repeat request identifiers.

Aspect 13: The method of any of aspects 10 to 12, wherein the subsequent single uplink transmission is a next configured grant occasion.

Aspect 14: The method of any of aspects 10 to 13, wherein the subsequent single uplink transmission is a next configured grant occasion associated with one of a subset of configured grant configuration identifiers.

Aspect 15: The method of aspect 14, wherein the subset of configured grant configuration identifiers includes one or more configured grant configuration identifiers of the plurality of uplink transmissions.

Aspect 16: The method of any of aspects 14 to 15, wherein the subset of configured grant configuration identifiers excludes one or more configured grant configuration identifiers of the plurality of uplink transmissions.

Aspect 17: The method of any of aspects 10 to 16, further comprising: receiving a feedback message with one or more bits identifying the failure associated with the plurality of uplink transmissions, wherein the feedback message does not include one or more operation parameters for the subsequent single uplink transmission; and using one or more stored operation parameters for the subsequent single uplink transmission.

Aspect 18: The method of any of aspects 10 to 17, further comprising: receiving a feedback message with one or more bits identifying the failure associated with the plurality of uplink transmissions, wherein the feedback message includes one or more operation parameters for the subsequent single uplink transmission; and using the one or more operation parameters for the subsequent single uplink transmission.

Aspect 19: The method of any of aspects 10 to 18, wherein the plurality of uplink transmissions is associated with a greater resource allocation than the subsequent single uplink transmission; and further comprising: scaling a configured grant resource allocation of the subsequent single uplink transmission to accommodate the plurality of uplink transmissions.

Aspect 20: The method of any of aspects 10 to 19, wherein the plurality of uplink transmissions is associated with a greater resource allocation than the subsequent single uplink transmission; and further comprising: increasing a modulation and coding scheme of the subsequent single uplink transmission to accommodate the plurality of uplink transmissions.

Aspect 21: The method of any of aspects 10 to 20, wherein the plurality of uplink transmissions is associated with a greater resource allocation than the subsequent single uplink transmission; and further comprising: splitting the plurality of uplink transmissions into a first subset of information for transmission using the subsequent single uplink transmission and a second subset of information for transmission using another subsequent uplink transmission.

Aspect 22: The method of any of aspects 10 to 21, further comprising: receiving a downlink control information including one or more bits identifying the failure associated with the plurality of uplink transmissions, wherein the downlink control information includes a dynamic grant for retransmission of one or more failed transport blocks or code block groups.

Aspect 23: The method of aspect 22, further comprising: selecting whether to transmit using a configured grant or the dynamic grant based at least in part on an order of the configured grant and the dynamic grant.

Aspect 24: The method of any of aspects 10 to 23, further comprising: receiving a downlink control information including one or more bits identifying the failure associated with the plurality of uplink transmissions, wherein the downlink control information includes a scheduling information for retransmission of one or more failed transport blocks or code block groups.

Aspect 25: An apparatus for wireless communication at a device, comprising a processor; memory coupled with the processor; and instructions stored in the memory and executable by the processor to cause the apparatus to perform the method of one or more aspects of aspects 1-9.

Aspect 26: A device for wireless communication, comprising a memory and one or more processors coupled to the memory, the memory and the one or more processors configured to perform the method of one or more aspects of aspects 1-9.

Aspect 27: An apparatus for wireless communication, comprising at least one means for performing the method of one or more aspects of aspects 1-9.

Aspect 28: A non-transitory computer-readable medium storing code for wireless communication, the code comprising instructions executable by a processor to perform the method of one or more aspects of aspects 1-9.

Aspect 29: A non-transitory computer-readable medium storing a set of instructions for wireless communication, the set of instructions comprising one or more instructions that, when executed by one or more processors of a device, cause the device to perform the method of one or more aspects of aspects 1-9.

Aspect 30: An apparatus for wireless communication at a device, comprising a processor; memory coupled with the processor; and instructions stored in the memory and executable by the processor to cause the apparatus to perform the method of one or more aspects of aspects 10-24.

Aspect 31: A device for wireless communication, comprising a memory and one or more processors coupled to the memory, the memory and the one or more processors configured to perform the method of one or more aspects of aspects 10-24.

Aspect 32: An apparatus for wireless communication, comprising at least one means for performing the method of one or more aspects of aspects 10-24.

Aspect 33: A non-transitory computer-readable medium storing code for wireless communication, the code comprising instructions executable by a processor to perform the method of one or more aspects of aspects 10-24.

Aspect 34: A non-transitory computer-readable medium storing a set of instructions for wireless communication, the set of instructions comprising one or more instructions that, when executed by one or more processors of a device, cause the device to perform the method of one or more aspects of aspects 10-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code-it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors coupled to the memory, the one or more processors configured to:
transmit a plurality of configured grant uplink transmissions associated with a plurality of uplink transmission occasions;
receive, in a single downlink control information, a hybrid automatic repeat request (HARQ) bitmap identifying a plurality of feedback indicators for the plurality of configured grant uplink transmissions, wherein the plurality of feedback indicators includes more than one acknowledgment or negative acknowledgment corresponding to the plurality of uplink transmission occasions and wherein an arrangement of bits in the HARQ bitmap is based at least in part on a HARQ identifier; and
retransmit one or more uplink transmissions, of the plurality of configured grant uplink transmissions, based at least in part on the received HARQ bitmap.

2. The UE of claim 1, wherein the plurality of uplink transmission occasions corresponds to a plurality of physical uplink shared channel transmission occasions with a plurality of different HARQ identifiers.

3. The UE of claim 1, wherein the plurality of uplink transmission occasions comprises a first physical uplink shared channel occasion and a second physical uplink shared channel occasion, and wherein the HARQ bitmap includes a first region including a first subset of the plurality of feedback indicators for the first physical uplink shared channel occasion and a second region including a second subset of the plurality of feedback indicators for the second physical uplink shared channel occasion.

4. The UE of claim 1, wherein the one or more processors are configured to retransmit the one or more uplink transmissions in one or more configured grants.

5. The UE of claim 1, wherein a first bit of the HARQ bitmap corresponds to a first transport block of an uplink transmission of the plurality of configured grant uplink transmissions and a second bit of the HARQ bitmap corresponds to a second transport block of the uplink transmission.

6. The UE of claim 1, wherein a first bit of the HARQ bitmap corresponds to a first code block group of an uplink transmission of the plurality of configured grant uplink transmissions and a second bit of the HARQ bitmap corresponds to a second code block group of the uplink transmission.

7. A user equipment (UE) for wireless communication, comprising:
a memory; and
one or more processors coupled to the memory, the one or more processors configured to:
transmit a plurality of configured grant uplink transmissions associated with a plurality of uplink transmission occasions;
receive a single downlink control information identifying a failure associated with the plurality of uplink transmission occasions, wherein the single downlink control information includes feedback information corresponding to the plurality of uplink transmission occasions and wherein the single downlink control information includes a hybrid automatic repeat request (HARQ) bitmap comprising an arrangement of bits that is based at least in part on a HARQ identifier; and
retransmit one or more uplink transmissions, of the plurality of configured grant uplink transmissions, based at least in part on the received single downlink control information.

8. The UE of claim 7, wherein the plurality of configured grant uplink transmissions associated with the plurality of uplink transmission occasions is a plurality of physical uplink shared channel transmissions associated with a plurality of physical uplink shared channel occasions.

9. The UE of claim 7, wherein the plurality of configured grant uplink transmissions is associated with a plurality of different HARQ identifiers, the plurality of different HARQ identifiers including the HARQ identifier.

10. The UE of claim 7, wherein the one or more uplink transmissions correspond to a next configured grant occasion.

11. The UE of claim 7, wherein the one or more uplink transmissions correspond to a next configured grant occasion associated with one of a subset of configured grant configuration identifiers.

12. The UE of claim 7, wherein to receive the single downlink control information, the one or more processors are configured to:
receive a feedback message including the HARQ bitmap, wherein the feedback message does not include one or more operation parameters for the one or more uplink transmissions, and
wherein to retransmit the one or more uplink transmissions, the one or more processors are configured to:
use one or more stored operation parameters for the one or more uplink transmissions.

13. The UE of claim 7, wherein the plurality of configured grant uplink transmissions is associated with a greater resource allocation than the one or more uplink transmissions; and
wherein to retransmit the one or more uplink transmissions, the one or more processors are configured to:
scale a configured grant resource allocation of the one or more uplink transmissions to accommodate at least a subset of the plurality of configured grant uplink transmissions, or
increase a modulation and coding scheme of the one or more uplink transmissions to accommodate at least a subset of the plurality of configured grant uplink transmissions.

14. The UE of claim 7, wherein the HARQ bitmap identifies a plurality of feedback indicators for the plurality of configured grant uplink transmissions, and wherein the HARQ bitmap includes a first region including a first subset of the plurality of feedback indicators for a first physical uplink shared channel occasion and a second region including a second subset of the plurality of feedback indicators for a second physical uplink shared channel occasion.

15. The UE of claim 7, wherein a first bit of the HARQ bitmap corresponds to a first transport block of an uplink transmission of the plurality of configured grant uplink transmissions and a second bit of the HARQ bitmap corresponds to a second transport block of the uplink transmission.

16. The UE of claim 7, wherein a first bit of the HARQ bitmap corresponds to a first code block group of an uplink transmission of the plurality of configured grant uplink transmissions and a second bit of the HARQ bitmap corresponds to a second code block group of the uplink transmission.

17. A method of wireless communication performed by a user equipment (UE), comprising:
   transmitting a plurality of configured grant uplink transmissions associated with a plurality of uplink transmission occasions;
   receiving, in a single downlink control information, a hybrid automatic repeat request (HARQ) bitmap identifying a plurality of feedback indicators for the plurality of configured grant uplink transmissions, wherein the plurality of feedback indicators includes more than one acknowledgment or negative acknowledgment corresponding to the plurality of uplink transmission occasions and wherein an arrangement of bits in the HARQ bitmap is based at least in part on a HARQ identifier; and
   retransmitting one or more uplink transmissions, of the plurality of configured grant uplink transmissions, based at least in part on the received HARQ bitmap.

18. The method of claim 17, wherein the plurality of uplink transmission occasions corresponds to a plurality of physical uplink shared channel transmission occasions with a plurality of different HARQ identifiers.

19. The method of claim 17, wherein the plurality of uplink transmission occasions comprises a first physical uplink shared channel occasion and a second physical uplink shared channel occasion, and wherein the HARQ bitmap includes a first region including a first subset of the plurality of feedback indicators for the first physical uplink shared channel occasion and a second region including a second subset of the plurality of feedback indicators for the second physical uplink shared channel occasion.

20. The method of claim 17, wherein a first bit of the HARQ bitmap corresponds to a first transport block of an uplink transmission of the plurality of configured grant uplink transmissions and a second bit of the HARQ bitmap corresponds to a second transport block of the uplink transmission.

* * * * *